United States Patent
Balthazard (12)

(10) Patent No.: US 6,405,788 B1
(45) Date of Patent: Jun. 18, 2002

(54) DEVICE FOR ASSEMBLING AN AFFIXED COMPONENT ONTO A HEAT EXCHANGER, FOR A MOTOR VEHICLE IN PARTICULAR

(75) Inventor: Patrick Balthazard, Guignicourt (FR)

(73) Assignee: Valeo Thermique Motuer, La Verriere (FR)

( * ) Notice: Subject to any disclaimer, the term of this patent is extended or adjusted under 35 U.S.C. 154(b) by 0 days.

(21) Appl. No.: 09/671,614

(22) Filed: Sep. 28, 2000

(30) Foreign Application Priority Data

Sep. 28, 1999 (FR) ............................................. 99 12077

(51) Int. Cl.[7] .............................................. F28F 9/007
(52) U.S. Cl. ..................... 165/67; 180/68.4; 248/231.81
(58) Field of Search ........................... 165/67; 180/68.4; 248/232, 229.16, 229.2, 231.81; 403/279, 281

(56) References Cited

U.S. PATENT DOCUMENTS

| 2,534,117 A | * | 12/1950 | Flick .......................... 248/226 |
| 3,355,787 A | * | 12/1967 | Sullivan, Jr. ................ 29/149.5 |
| 3,849,009 A | * | 11/1974 | Bourdon ...................... 403/133 |
| 3,950,829 A | * | 4/1976 | Cohen .......................... 211/124 |
| 4,564,168 A | * | 1/1986 | Ikuta et al. .................. 248/638 |
| 4,766,968 A | * | 8/1988 | Matsunaga .................. 180/68.4 |
| 5,558,310 A | * | 9/1996 | Furuie et al. ............... 248/573 |
| 6,047,868 A | * | 4/2000 | Petrou et al. .................. 223/96 |
| 6,116,482 A | * | 9/2000 | Heiber .......................... 223/96 |
| 6,189,958 B1 | * | 2/2001 | Guyomard et al. ......... 296/194 |

FOREIGN PATENT DOCUMENTS

| DE | 3120892 A1 | * | 12/1982 |
| EP | 0811821 | | 12/1997 |
| EP | 0938990 | | 9/1999 |
| FR | 2527325 | | 11/1983 |
| FR | 2748559 | | 11/1997 |

* cited by examiner

Primary Examiner—Allen Flanigan
(74) Attorney, Agent, or Firm—Liniak, Berebato, Longacre & White

(57) ABSTRACT

A molded plastics component capable of being fitted onto a receiving part of a heat exchanger, is assembled to this heat exchanger by a crimping component adapted for at least partially enveloping that component. It includes a crimping part engaged in the receiving part to secure the two together. Application to assembling of a fixing component onto a motor-vehicle heat exchanger.

20 Claims, 1 Drawing Sheet

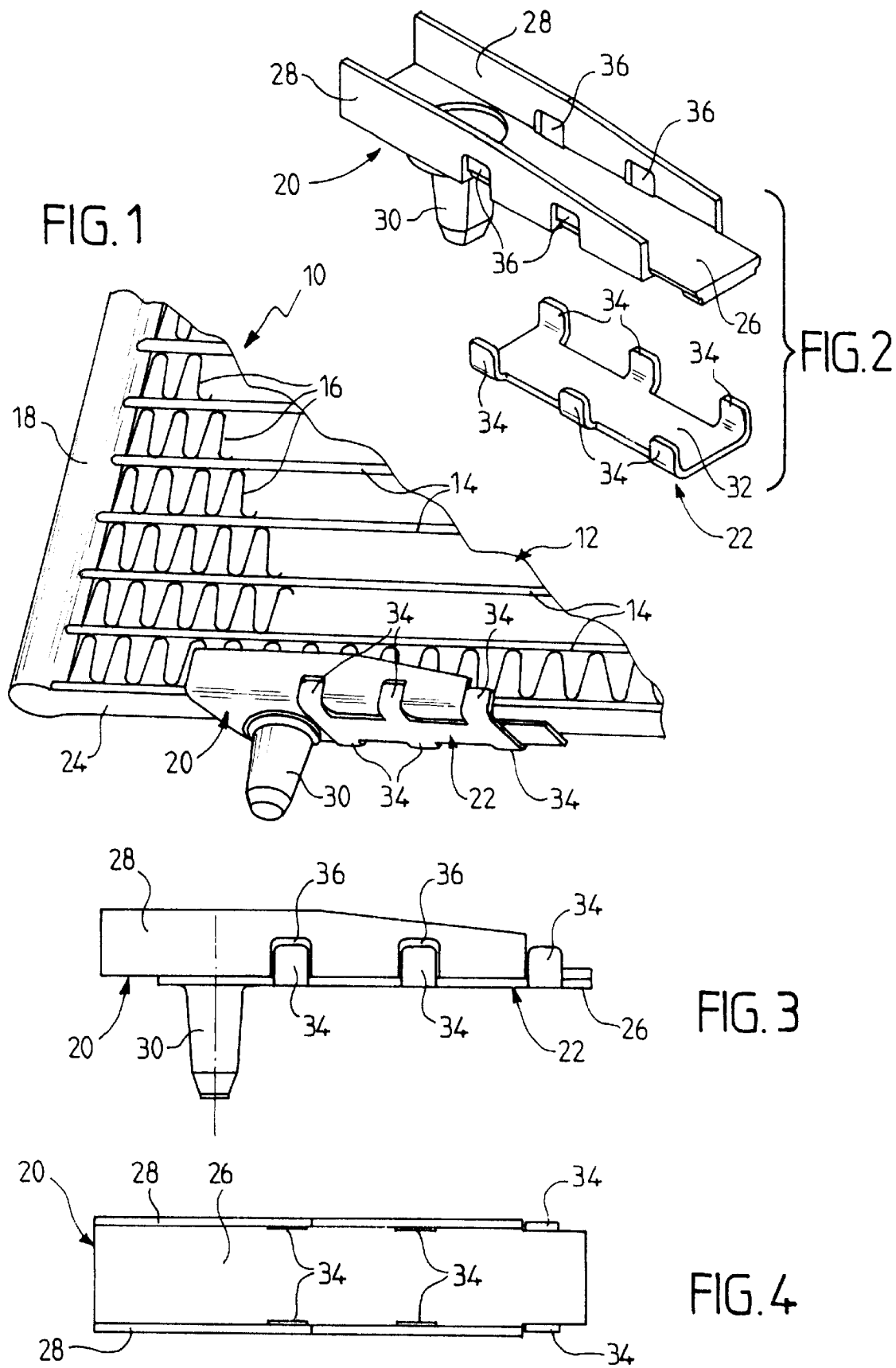

DEVICE FOR ASSEMBLING AN AFFIXED COMPONENT ONTO A HEAT EXCHANGER, FOR A MOTOR VEHICLE IN PARTICULAR

FIELD OF THE INVENTION

The invention relates to heat exchangers, for a motor vehicle in particular, and more specifically to a device for assembling an affixed component onto a metal receiving part of such a heat exchanger.

BACKGROUND OF THE INVENTION

Heat exchangers of this type usually comprise a tube bank formed by a multiplicity of tubes and of fins, as well as at least one manifold mounted at one end of the bank. In the field of motor vehicles, the heat exchanger is generally either a radiator for cooling the engine, or a radiator for heating the passenger compartment, or an evaporator of the air-conditioning circuit, or else a condenser of the air-conditioning circuit.

It is generally necessary to be able to assemble at least one affixed component onto such a heat exchanger, for example in order to provide for the heat exchanger to be fixed onto the structure of the vehicle, or else in order to provide for an accessory to be fixed onto the heat exchanger.

Thus, in the majority of applications, this affixed component constitutes a fixing element.

The assembling of such an affixed component onto a manifold of the heat exchanger generally poses no particular difficulty. This is because, when this manifold is made of plastic, it is not generally necessary to provide an affixed component s this component can usually be molded integrally with the manifold itself.

Likewise, when the manifold is made of metal, it is easily possible to fix the affixed component either mechanically or else by brazing.

In fact, difficulties are usually countered for assembling an affixed component when the metal receiving part forms part of the tube bank of the exchanger.

This is because such a tube bank comprises a multiplicity of tubes and of fins, these fi s possibly being either flat fins traversed by the tubes of the bank, or else fins in the form of corrugated spacers arranged between the tubes. In this latter case, the corrugated fins and the tubes are assembled together by brazing.

The assembling of such an affixed component onto a heat exchanger, in particular onto the tube bank thereof, also poses practical difficulties because of the particular shapes which these affixed components have to possess.

When these components are made of metal, they can be fixed by riveting, which poses problems of corrosion resistance.

It is also known to produce them from plastic, which makes it possible to obtain specific shapes, but the fixing of such affixed plastic components poses practical difficulties.

One object of the invention is at least partially to mitigate these and other drawbacks of the prior art.

SUMMARY OF THE INVENTION

According to a first aspect the invention provides a device for assembling an affixed component onto a metal receiving part of a heat exchanger, wherein the affixed component is of molded plastic and is capable of being fitted onto the receiving part, and wherein provision is further made for a crimping component suitable for at least partially enveloping the affixed component and including crimping means suitable for being engaged in the receiving part in order to secure the affixed component to the receiving part.

Hence, the affixed component is produced from plastic and it is secured to the heat exchanger by means of a crimping component, of specific shape, which comes into engagement with the receiving part of the heat exchanger.

That being so, it is possible to produce an affixed component, for example a fixing component, possessing a specific shape obtained by molding and capable of being secured onto the heat exchanger by means of the crimping component.

Thus the affixed component is not itself assembled directly onto the heat exchanger, but it is held secured to it by the crimping component, thus being held "sandwiched".

Advantageously, the affixed component is suitable for fitting onto the receiving part by shape interlocking.

The device of the invention applies in particular to the case in which the receiving part forms part of a tube bank of the heat exchanger.

In this case the affixed component advantageously assumes a U-shaped cross section with a web and two branches arising from the web, so as to sit over one end face of the tube bank.

In one embodiment, each of the branches of the affixed component includes at least one aperture for the crimping means to pass through.

The affixed component is advantageously produced from polypropylene.

In one preferred embodiment, the crimping component comprises a plate able to come into external abutment against the affixed component, and to which the crimping means are attached.

This crimping component is preferably produced from a corrosion-resistant metal material, for example from stainless steel.

The crimping means preferably comprise folding lugs.

According to another characteristic of the invention, the affixed component is molded integrally with at least one fixing lug.

According to a second aspect of the invention there is provided a heat exchanger equipped with at least one affixed component which is assembled onto a receiving part of the said exchanger, wherein the affixed component is of molded plastic and is capable of being fitted onto the receiving part, and wherein provision is further made for a crimping component suitable for at least partially enveloping the affixed component, the assembly being by means of a device including crimping means suitable for being engaged in the receiving part in order to secure the affixed component to the receiving part.

Preferably the affixed component is suitable for fitting onto the receiving part by shape interlocking.

Advantageously the receiving part forms part of a tube bank of the heat exchanger, wherein the affixed component has a U-shaped cross section with a web and two branches arising from the web, so as to sit over one end face of the tube bank.

Conveniently each of the branches of the affixed component includes at least one aperture for the crimping means to pass through.

Advantageously the affixed component is of polypropylene.

Preferably the crimping component comprises a plate able to come into external abutment against the affixed component, and to which the crimping means are attached.

Advantageously the crimping component is produced from a corrosion-resistant metal material.

Conveniently said corrosion-resistant metal material is stainless steel.

Preferably the crimping means of the crimping component comprise folding lugs.

Advantageously the affixed component is molded integrally with at least one fixing lug.

BRIEF DESCRIPTION OF THE DRAWINGS

In the description which follows, given solely by way of example, reference is made to the attached drawings, in which:

FIG. 1 is a partial view in perspective of a heat exchanger equipped with an affixed component assembled to it by an assembling device according to the invention;

FIG. 2 is an exploded view in perspective of the component and of the crimping component before assembling;

FIG. 3 is a side view of the affixed component and of the crimping component after assembling; and FIG. 4 is a top view corresponding to FIG. 3.

DESCRIPTION OF THE PREFERRED EMBODIMENTS

In the various figures, like reference numerals refer to like parts.

Referring first of all to FIG. 1, part of a heat exchanger 10 is shown, comprising a tube bank 12 formed by a multiplicity of parallel tubes 14 between which are arranged fins 16, produced in the form of corrugated spacers. The tubes 14 are flat metal tubes, advantageously of aluminum, and the fins 16 are also metal, advantageously of aluminum, and assembled by brazing to the tubes 14. The tube bank 12 is assembled, at at least one of its ends, to a manifold 18 of tubular shape, the tubes 14 having extremities engaged in slots specially formed in the wall of the manifold. The tubes are also assembled to the manifold by brazing.

The heat exchanger 10 is equipped with an affixed component 20, in this example a fixing component, which is assembled onto the tube bank 12 by means of a crimping component 22.

The affixed component 20 is produced from plastic, for example from polypropylene, and it is shaped so as to fit onto a receiving part which, in this example, is an end face 24 of the tube bank 12, this face consisting here of a traverse or cheek 14 placed at one end of the tube bank.

The affixed component 20 assumes a U-shaped cross section and it includes a web 26, generally flat, of rectangular shape overall, able to come into abutment against the receiving part 24. In this example, the web 26 possesses a width which corresponds substantially to that of the end face 24, that is to say of a tube of the tube bank. This web 26 is connected, on either side, to two branches 28 which are substantially parallel and able to come to frame the tube bank 12. The web 26 and two branches 28 which arise from it are able to sit over the end face 24 of the tube bank, as can be seen best in FIG. 1.

The affixed component 20 comprises a fixing lug 30 molded integrally with it. This fixing lug has the shape of a pin which is attached externally to the web 26 of the affixed component 20. This pin is suitable for being engaged in an aperture of corresponding shape (not represented) forming part, for example, of the structure of a motor vehicle in order to allow the heat exchanger to be fixed onto this structure.

The crimping component 22 is designed to secure the affixed component 20 onto the receiving part 24 of the heat exchanger. The crimping component 22 comprises (FIGS. 1 to 4) a plate 32 of generally rectangular shape suitable for coming into external abutment against the affixed component 20, and more particularly against the web 26 thereof. This crimping component is produced from a corrosion-resistant metal material, for example from stainless steel.

The plate 32 is equipped, on each side, with three crimping lugs 34 capable of being folded over and down substantially at right angles. Each of the branches 28 of the affixed component 20 comprises (FIGS. 2 and 3) two apertures 36 suitable for letting through crimping lugs 34 of the crimping component 22. The other two crimping lugs, which are also arranged face to face, are situated outside the region of the branches 28, as can be seen best in FIGS. 1, 3 and 4.

Hence, after the affixed component 20 has been put in place on the receiving part 24 of the heat exchanger, it is sufficient to locate the crimping component 22 then to fold down the crimping lugs 34 so that these engage in the tube bank 10, that is to say on either side of a spacer fin 14. These lugs, which are of metal, thus come to be anchored in the tube bank so as to achieve crimping of the component 22 with this tube bank. This results in the affixed component 20 being trapped in a "sandwich" between the receiving part 24 and the crimping component 22, which ensures that the affixed component is perfectly secure on the heat exchanger.

That being so, the affixed component is secured to the heat exchanger, without having recourse to riveting.

Moreover, because this affixed component is made of plastic, there is no risk of a corrosion problem being posed at the interface with the heat exchanger. Furthermore, because this affixed component is made of molded plastic, it can be produced in very specific shapes, which could not been obtained with a metal material.

Moreover, as the crimping component is produced from a corrosion-resistant metal material, neither is there any risk of a corrosion phenomenon arising at the interface between the crimping component and the heat exchanger.

Clearly, the invention is not limited to the embodiment described above by way of example, and it extends to other variants.

The invention applies more particularly to the assembling of an affixed component, in particular of a fixing component, onto a heat exchanger suitable for forming part of a motor vehicle.

What I claim is:

1. A device for assembling an affixed component onto a metal receiving part of a heat exchanger, wherein the affixed component is of molded plastic and is fitted onto the receiving part, comprising a crimping component at least partially enveloping the affixed component and including crimping means for being engaged in the receiving part in order to secure the affixed component to the receiving part.

2. The device of claim 1, wherein the affixed component is fitted onto the receiving part by shape interlocking.

3. The device of claim 1, in which the receiving part forms part of a tube bank of the exchanger, wherein the affixed component has a U-shaped cross section with a web and two branches arising from the web, so as to sit over one end face of the tube bank.

4. The device of claim 3, wherein each of the branches of the affixed component includes at least one aperture for the crimping means to pass through.

5. The device of claim 1, wherein the affixed component is made of polypropylene.

6. The device of claim 1, wherein the crimping component comprises a plate in external abutment against the affixed component, and to which the crimping means are attached.

7. The device of claim 1, wherein the crimping component is produced from a corrosion-resistant metal material.

8. The device of claim 7 wherein said corrosion-resistant metal material is stainless steel.

9. The device of claim 1, wherein the crimping means of the crimping component comprise folding lugs.

10. The device of claim 1, wherein the affixed component is molded integrally with at least one fixing lug.

11. A heat exchanger equipped with at least one, affixed component which is assembled onto a receiving part of said exchanger, wherein the affixed component is of molded plastic and is fitted onto the receiving part, comprising a crimping component at least partially enveloping the affixed component, and including crimping means for being engaged in the receiving part in order to secure the affixed component to the receiving part.

12. The heat exchanger of claim 11, wherein the affixed component is fitted onto the receiving part by shape interlocking.

13. The heat exchanger of claim 11, in which the receiving part forms part of a tube bank of the heat exchanger, wherein the affixed component has a U-shaped cross section with a web and two branches arising from the web, so as to sit over one end face of the, tube bank.

14. The heat exchanger of claim 13, wherein each of the branches of the affixed component includes at least one aperture for the crimping means to pass through.

15. The heat exchanger of claim 11, wherein the affixed component is made of polypropylene.

16. The heat exchanger of claim 11, wherein the crimping component comprises a plate in external abutment against the affixed component, and to which the crimping means are attached.

17. The heat exchanger of claim 11, wherein the crimping component is produced from a corrosion-resistant metal material.

18. The heat exchanger of claim 17 wherein said corrosion-resistant metal material is stainless steel.

19. The heat exchanger of claim 11, wherein the crimping means of the crimping component comprise folding lugs.

20. The heat exchanger of claim 11, wherein the affixed component is molded integrally with at least one fixing lug.

* * * * *